Sept. 9, 1947.    A. C. WILSON    2,427,080
SIDE-LOADING ATTACHMENT FOR SHAKING CONVEYERS
Filed Nov. 8, 1944    2 Sheets-Sheet 2

ANDREW C. WILSON
INVENTOR.

BY
*H. A. McGrew*

ATTORNEY

Patented Sept. 9, 1947

2,427,080

UNITED STATES PATENT OFFICE 2,427,080

SIDE-LOADING ATTACHMENT FOR SHAKING CONVEYORS

Andrew C. Wilson, Frederick, Colo.

Application November 8, 1944, Serial No. 562,443

4 Claims. (Cl. 198—220)

My invention relates to material handling apparatus, and particularly to conveyors of the reciprocating type for coal and similar materials.

Conveyors of the reciprocating or shaker type may be employed to transport loose materials such as coal; and conveyors of this type have been used extensively in the coal industry. Reciprocating conveyors comprise troughs arranged to be moved horizontally through limited forward and backward strokes; the forward stroke is slow and the backward stroke sudden so that the material on the conveyor is moved forward by the forward stroke and tends to remain stationary during the sudden backward stroke. This type of conveyor has proved very satisfactory in coal mining operations. It frequently happens that auxiliary conveyors are desirable to remove coal mined in cross-cuts or other lateral workings. Many types of auxiliary conveyors have been employed both with auxiliary power and with power take-offs from the main conveyor drive, but these conveyors have not proved entirely satisfactory. Accordingly it is an object of my invention to provide in a reciprocating type conveyor system an improved auxiliary conveyor driven by the main conveyor.

It is another object of my invention to provide an improved auxiliary or lateral conveyor for reciprocating conveyor systems which shall be of simple and rugged construction and shall be driven from the main conveyor with the same movement as that of the main conveyor.

Further objects and advantages of my invention will become apparent from the following description and the features of novelty which characterize my invention will be pointed out with particularity in the claims appended to and forming a part of this specification.

For a better understanding of my invention reference may be had to the accompanying drawings in which, Fig. 1 is a plan view of a portion of a conveyor system of the reciprocating type embodying my invention;

Figure 1:
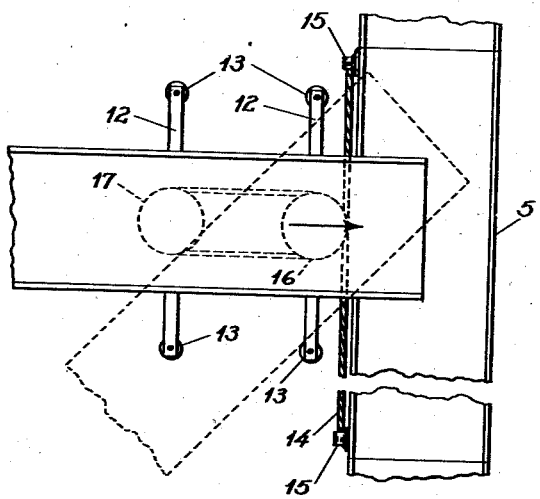

Briefly, the conveyor system illustrated in the drawings comprises a main conveyor of the reciprocating or shaker type, and an auxiliary or lateral conveyor driven from the main conveyor through a transmission mechanism which moves the auxiliary conveyor with the same reciprocating action as the main conveyor. The driving mechanism is mounted on a support anchored adjacent the main conveyor, and a cable drive is employed to transmit the movement to the auxiliary conveyor. This drive includes a cable secured at its ends to the main conveyor on either side of the support and looped about idler wheels or pulleys on the support. The auxiliary conveyor rests on a reciprocable carriage mounted on the support and attached to the cable to be driven thereby.

Figure 2:
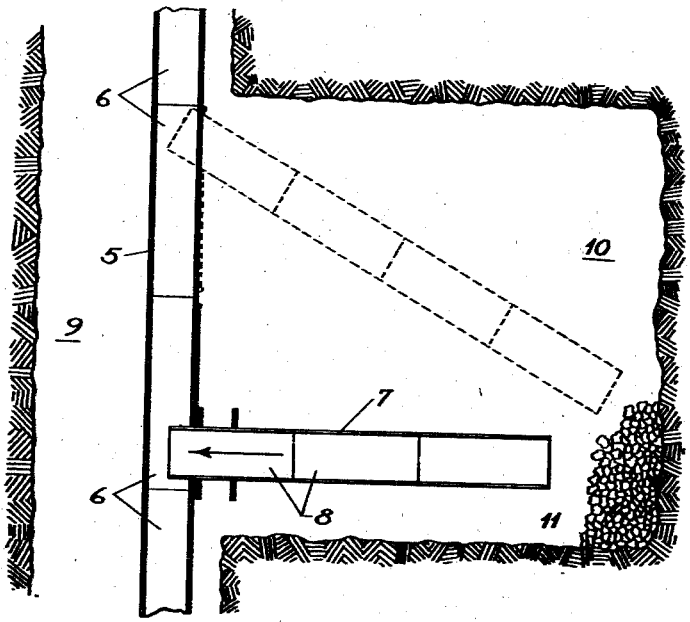
Fig. 2 shows the conveyor system of Fig. 1 located in a mine with the auxiliary conveyor on the opposite side from its position in Fig. 1.

Referring now to the drawing, the conveyor system as shown in Figs. 1 and 2 includes a main conveyor 5 comprising a plurality of trough sections 6 and an auxiliary or lateral conveyor 7 comprising a plurality of trough sections 8. The supporting and driving arrangements of the main conveyor have not been illustrated as they are not necessary to an understanding of the present invention. It will be understood, however, that the main conveyor is driven by any suitable reciprocating drive of the type which provides a relatively slow forward stroke and a quick return stroke, the material being advanced during each forward stroke because its inertia prevents its moving back with the conveyor during the quick return stroke. The several separate trough sections of each conveyor are suitably locked together at their ends to form a continuous trough.

As shown in Fig. 2 the main conveyor may be located along the main tunnel 9 of a mine, and the auxiliary conveyor 7 may be employed to carry to the main conveyor the coal mined in a side working or cross-cut 10, a pile of such mined coal being indicated at 11. The conveyor 7 is located at a level above the conveyor 5 on a supporting structure including two cross-beams 12 having jacks 13 at their ends which anchor the support firmly in position adjacent the main conveyor 5. In order to drive the auxiliary conveyor, a power take-off is provided on the support for connection with the main conveyor. This power take-off comprises a cable 14, such as a wire rope, having its ends securely anchored to lugs or brackets 15 on the main conveyor on either side of the support. The cable passes from one lug 15 over one side of a first or front idler wheel or pulley 16 on the support and thence around a second or rear idler 17, also mounted on the support, then back around the other side of the idler 16 to the other anchor lug 15. Both lugs 15 preferably are located on the same one of the trough sections 6.

Figure 3:
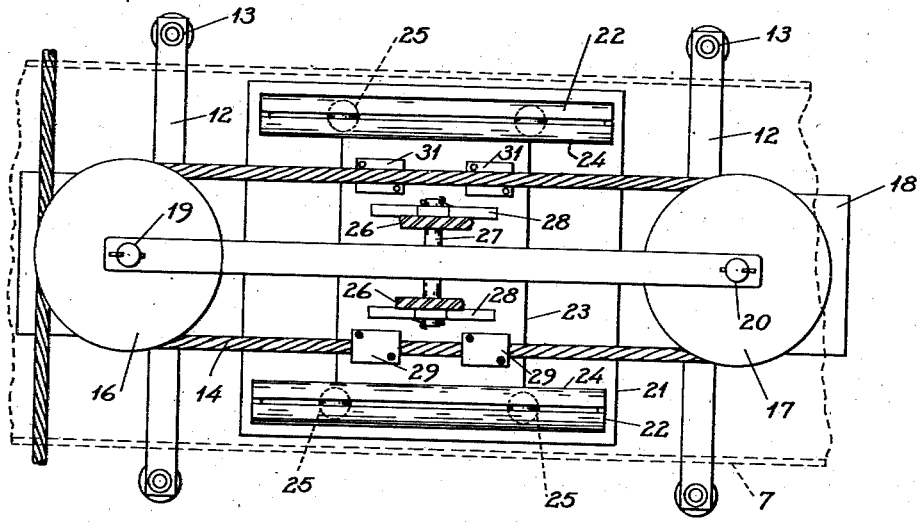
Fig. 3 is an enlarged plan view of the driving mechanism for the auxiliary conveyor of the system of Fig. 1.
Figure 4:
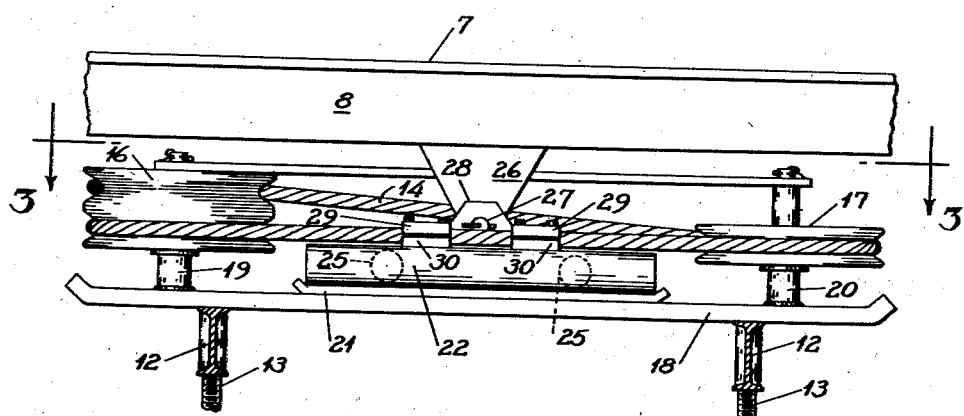
Fig. 4 is a side elevation view of the mechanism of Fig. 3 (Fig. 3 being taken on the line 3—3 of Fig. 4).

The details of construction of the support for the auxiliary conveyor and of the power take-off will be evident upon reference to Figs. 3 and 4. A plate-like longitudinal frame 18 is mounted on the two cross-bars and secured thereto preferably by welding. The idlers 16 and 17 are mounted on opposite ends of the frame 18 on vertical shafts 19 and 20, respectively. The idler 16 is a double grooved pulley so that the two sides of the cable loop may pass over the idler 16 without interference. The loop of the cable extends between the spaced idlers longitudinally of the support and in the direction of movement of the auxiliary conveyor 7 which is attached to be driven by one of the straight side portions of the cable loop in a manner to be described.

In order to provide a reciprocable support for the auxiliary conveyor 7 a base plate 21 is welded or otherwise suitably secured at the center of the frame 18, and a pair of semi-cylindrical tracks or guides 22 are secured at the sides of the plate 21. A carriage or platform 23 is mounted for reciprocating movement on the support by means of a second pair of semi-cylindrical guides or tracks 24 opposite and complementary to the pair of tracks 22, and a plurality of balls 25 are seated in the split cylindrical guides thus formed by the complementary pairs of tracks. An upright support 26 is pivoted on the supporting platform 23 on a pin 27 mounted in lugs 28. The platform 23 may be connected directly to either side of the cable 14 by clamps 29 which may be bolted to pairs of blocks 30 and 31 welded on the platform in alinement with the respective two sides of the cable loop. The cable has been shown clamped to the blocks 30 which are on the near side of the support as viewed in Fig. 4. This near side of the cable loop is horizontal and parallel to the frame 18 whereas the far side of the cable loop is inclined because it is engaged in the upper groove of the pulley 16. However, it is obvious that, should it be desired to clamp the far side of the cable loop to the blocks 31, one end of the cable may be released from its lug 15 and the position of the sides of the cable on the grooves of the pulley 16 then reversed so that the far side of the cable will lie parallel to the frame 18.

The support 26 may be constructed as a rigid part of the first trough section 8 of the auxiliary conveyor 7 and preferably is welded to the section. It will thus be apparent that the conveyor 7 is driven with the same reciprocating movement as the main conveyor 5, and the material loaded on the conveyor will be supplied to the main conveyor onto which it falls by gravity from the end of the conveyor 7.

The front idler pulley 16 is located closely adjacent the main conveyor 5 so that the end portions of the cable 14 which are parallel to the main conveyor extend tangentially from either side of the rear idler 16 toward the lugs 15. For this reason the entire supporting structure may be located within a wide range of angles about the axis 19 of the idler 16. It is thus possible to have the auxiliary conveyor positioned at angles other than normal to the main conveyor, and two other positions have been indicated by the dotted lines in Figs. 1 and 2. It will be understood, of course, that the entire supporting structure including the frame 18 and supporting jacks 13 must be moved into alinement according to the desired angle of the conveyor 7 with respect to the main conveyor.

The angular position indicated by dotted lines in Fig. 1 makes it appear that the material might not fall into the main conveyor because one side of the auxiliary conveyor is not directly over the main conveyor; however, if the end of the auxiliary conveyor is sufficiently elevated above the main conveyor so that the overhanging corner is at an angle of about 30° from the vertical with respect to the edge of the main conveyor, all the material delivered by the auxiliary conveyor will fall onto the main conveyor.

From the foregoing it is readily apparent that I have provided a simple and rugged auxiliary conveyor drive which makes it possible to locate the auxiliary conveyor at any convenient position on either side of the main conveyor and at any angle within a wide range of angles. Furthermore, the auxiliary conveyor is driven with the same positive and effective motion as the main conveyor.

While I have described a specific embodiment of my invention, modifications will occur to those skilled in the art. For example, it is obvious that other types of cables such as link chains engaging idler sprockets may be employed instead of wire ropes and pulleys, and the term "cable" as used in the appended claims is thus sufficiently broad to include all types of rope, wire rope, chains, link constructions, and the like which are sufficiently flexible to pass around the idlers. I do not, therefore, desire my invention to be limited to the particular construction illustrated and described and I intend, by the appended claims, to cover all modifications which fall within the true spirit and scope of my invention.

What I claim and desire to secure by Letters Patent is:

1. In a material handling system of the reciprocating conveyor type, a main reciprocating conveyor, a stationary support adjacent said main conveyor, a double idler pulley mounted on said support adjacent said conveyor, a single idler pulley mounted on said support and spaced from said double pulley, a rope looped about said pulleys and having its ends secured to said main conveyor one on either side of said support, a carriage mounted for reciprocation on said support and connected to said rope on one side of the loop between said pulleys, and an auxiliary conveyor pivotally supported on said carriage to be reciprocated upon reciprocation of said main conveyor.

2. In a material handling system, a main reciprocating conveyor; an auxiliary conveyor extending at an angle to said main conveyor; a cable reciprocable with said main conveyor and having ends extending in opposite directions and attached to said main conveyor; cable guide means for forming a loop having sides extending in the direction of said auxiliary conveyor, one end of said loop being adjacent said main conveyor and the portions of said cable at such end of said loop being movable about the same pivotal axis of rotation; a support for said cable guide means; and means connecting said cable on at least one side of said loop with said auxiliary conveyor to reciprocate the latter from said main conveyor.

3. In a material handling system of the reciprocating conveyor type, a main reciprocating conveyor, a stationary support adjacent said main conveyor, idler means spaced apart and mounted on said support, a driving cable looped about said idler means with portions extending in opposite directions and having its ends attached to said main conveyor one on either side of said support, the loop formed by said cable providing two straight cable portions between said idler means, a carriage mounted for reciprocation on said support, an auxiliary conveyor, means for securing said auxiliary conveyor to said carriage for reciprocation therewith, and means for selectively attaching said carriage to either of said straight cable portions to drive said auxiliary conveyor and move material thereon in either direction as desired.

4. In a material handling system as defined in claim 3, wherein the pivotal axis of at least one idler means is located on the center line of said auxiliary conveyor.

ANDREW C. WILSON.

REFERENCES CITED

The following references are of record in the file of this patent:

UNITED STATES PATENTS

| Number | Name | Date |
|---|---|---|
| 1,593,731 | Stebbins | July 27, 1926 |
| 1,895,673 | Luke | Jan. 31, 1933 |
| 1,922,198 | Crawford | Aug. 15, 1933 |

FOREIGN PATENTS

| Number | Country | Date |
|---|---|---|
| 295,066 | Germany | Nov. 9, 1916 |